United States Patent [19]

Dorn et al.

[11] Patent Number: 5,319,492
[45] Date of Patent: Jun. 7, 1994

[54] OPTICAL SWITCH

[75] Inventors: Reimund Dorn, Schwieberdingen; Peter Kersten, Leonberg; Werner Rehm, Stuttgart; Wiltraud Wischmann, Gerlingen, all of Fed. Rep. of Germany

[73] Assignee: Alcatel N.V., Amsterdam, Netherlands

[21] Appl. No.: 884,121

[22] Filed: May 18, 1992

[30] Foreign Application Priority Data

May 23, 1991 [DE] Fed. Rep. of Germany ....... 4116789

[51] Int. Cl.⁵ .................. G02B 26/00; G02F 1/29; G02F 1/01
[52] U.S. Cl. .................. 359/296; 359/320; 359/288; 359/245
[58] Field of Search ........... 359/320, 315, 298, 296, 359/276, 254, 250, 245, 573, 569, 289, 288

[56] References Cited

U.S. PATENT DOCUMENTS

| | | | |
|---|---|---|---|
| 3,787,111 | 1/1974 | Giordmaine et al. | 359/315 |
| 4,243,300 | 1/1981 | Richards et al. | 359/315 |
| 4,389,096 | 6/1983 | Hori et al. | 359/292 |

FOREIGN PATENT DOCUMENTS

| | | |
|---|---|---|
| 0455020A2 | 11/1991 | European Pat. Off. . |
| 1046734 | 2/1989 | Japan . |
| 2240188 | 7/1991 | United Kingdom . |
| 91/04506 | 4/1991 | World Int. Prop. O. . |

OTHER PUBLICATIONS

J. Barry McManus et al.: "Switched holograms for . . . ", Applied Optics, vol. 27, No. 20, Oct. 15, 1988, p. 4244.

Joseph Zyss et al.: "Optical Parametric Interactions . . . ", IEEE Journal of Quantum Electronics, vol. Qe-21, No. 8, Aug. 1985, p. 1286.

Hilary L. Hampsch et al.: "Second harmonic generation . . . ", American Institute of Physics, J. Appl. Phys. 67(2), Jan. 15, 1990 p. 1037.

Hill et al. "Demonstration of the Linear Electro-Optic Effect in a Thermopoled Polymer Film," J. Appl. Phys. 64 (5), Sep. 1, 1988, pp. 2749-2751.

*Primary Examiner*—Loha Ben
*Assistant Examiner*—Evelyn A. Lester
*Attorney, Agent, or Firm*—Spencer, Frank & Schneider

[57] ABSTRACT

An optical switch has a substrate and a transparent material in which a three-dimensional diffraction pattern is recorded which is capable of diffracting light, the material having non-linear optical properties and extending in the form of a first layer above the substrate. At least one first electrode and at least one second electrode are provided for varying the diffraction pattern in accordance with applied voltages.

18 Claims, 1 Drawing Sheet

OPTICAL SWITCH

BACKGROUND OF THE INVENTION

1. Field of the Invention

The present invention relates to an optical switch of a transparent material in which a three-dimensional diffraction pattern is recorded.

2. Background Information

In the simplest case, optical switches are used to deflect a single light beam either in a direction A or in a direction B. By the switching action, the light beam is directed either toward a receiver A' in direction A or toward a receiver B' in direction B. The light beam can thus be switched between the receivers A' and B'. In another, even simpler optical switch, the light beam is either passed or reflected, so that it can be turned on or off in the direction of a single receiver A'. As part of such a switch which deflects the light beam in a first or second direction, a hologram is especially suited.

From APPLIED OPTICS Vol. 27, no. 20 (1988), pp. 4244 to 4250, an optical switch ("Holoswitch") is known which comprises an array of liquid crystal cells and polarizing beam splitters, as well as a plane arrangement of holograms.

In the optical switch, one liquid crystal cell, one beam splitter, and one hologram are respectively associated with one another. The holograms form invariable, predetermined diffraction patterns.

Each of the liquid crystal cells deflects a bundle of light beams, generated by, e.g., several laser sources, toward one of the holograms, which deflects the light beams toward an associated detector.

The liquid crystal cells are electrically controlled devices. They switch between two mutually perpendicular polarization states in the light beams, according to the voltage applied to them. The beam splitters, which follow the liquid crystal cells in the direction of transmission of the light beams, transmit or reflect the light beams depending on the state of polarization. Thus, the light beams pass through the liquid crystal cell and the beam splitter before reaching the respective hologram.

This prior art optical switch is constructed in an aluminum box, measuring 19 by 19 by 23 cm, which also contains support structures. This means that the optical switch takes up considerable space.

In addition, the change between the two polarization states in the liquid crystal cells limits the switching speed of this optical switch.

SUMMARY OF THE INVENTION

It is the object of the invention to provide an optical switch which is also suitable for high optical transmission rates.

This object is attained by an optical switch in which a non-linear material is used in the form of a first layer above a substrate and first and second electrodes vary a diffraction pattern recorded in the material in accordance with applied voltages.

An optical switch according to the invention has the advantage of being easy to manufacture, since it includes neither liquid crystal cells, which must be electrically controlled on an individual basis, nor beam splitters. This also results in a space-saving design.

Further advantageous features of the invention will become apparent from the detailed description taken with the drawings.

BRIEF DESCRIPTION OF THE DRAWINGS

Embodiments of the invention will now be explained with reference to the accompanying drawings, in which.

DETAILED DESCRIPTION OF THE PREFERRED EMBODIMENTS

Figure 1:
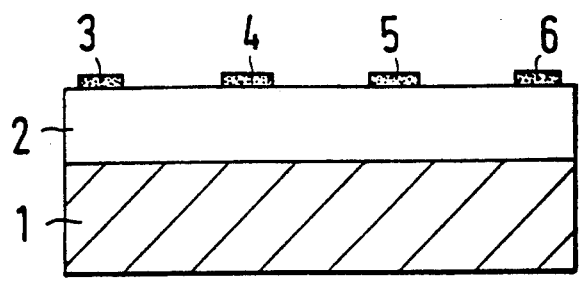
FIG. 1 shows an optical switch with a single layer.

An optical switch (FIG. 1) comprises a substrate 1 and a layer 2 provided thereon. The substrate 1 is preferably of a dielectric material, e.g., glass. The material of the layer 2 has nonlinear optical properties; and may be an inorganic or organic crystal, a polymer, or a mixture of polymers in which at least one of the polymers has nonlinear properties. The layer 2 preferably has a thickness of 1 $\mu$m or approximately few micrometers.

Deposited on the layer 2 are electrodes 3, 4, 5, and 6, which may be transparent and are of indium-tin oxide, for example. To these electrodes, voltages are applied during operation. As a result, electric fields are produced between the electrodes, e.g., between electrodes 3 and 4 and between electrodes 5 and 6, generating a three-dimensional diffraction grating in the layer 2. The electric fields produced change, for example, the refractive index of the material 2 in the area between the electrodes, whereby an interference pattern is produced in the layer 2 which can be varied in accordance with the applied voltages. If a wave of preferably coherent light is launched into layer 2, preferably from above, it will strike this interference pattern. The light wave will then be deflected as a whole in a given direction, or parts of the wave will each be deflected in different directions. By the electric field in the layer 2, the refractive index and the absorption of this layer can be changed.

For the layer 2, second-order nonlinear optical polymers are especially suited. Such polymers are known, for example, from IEEE J. Quantum Electronics, Vol. QE-21, No. 8, pp. 1286–1295. These polymers contain dye molecules, for example, which must be spatially oriented for the application being discussed here. This orientation is preferably established by poling. To do this, the layer 2 is heated, preferably to a temperature near the softening point, exposed to an electric field, and cooled down with the electric field applied to it.

The orientation of the dye molecules by the poling influences the refractive index of these polymers. An interference pattern can thus be set up in layer 2 which is modifiable by a change in refractive index even after its production by application of electric fields.

Figure 2:
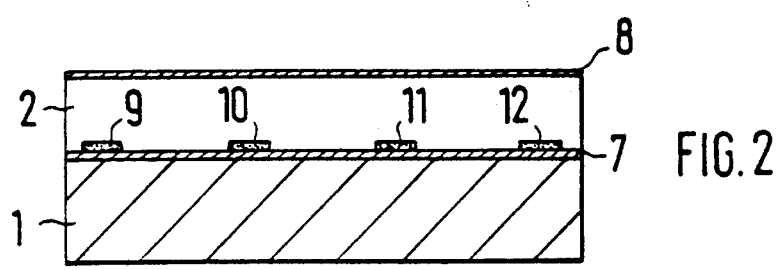
FIG. 2 shows an optical switch comprising a Fabry-Pérot resonator.

Instead of being deposited on the layer 2 as shown in FIG. 1, electrodes may be provided between the substrate 1 and the layer 2. An optical switch as shown in the embodiment of FIG. 2 includes a Fabry-Perot resonator. Besides the substrate 1 and the layer 2, it has mirrors 7, 8, which are made of a dielectric material, for example. The mirror 7 extends between the layer 2 and the substrate 1, and the mirror 8 is provided atop the layer 2. The top side of the mirror 7 is provided with electrodes 9 to 12.

Instead of being arranged on the top side of the mirror 7, the electrodes 9 to 12 may be disposed between the substrate 1 and the mirror 7. The mirror 8 is partially transparent to a wave incident on its top side, and the mirror 7 is either partially transparent or reflecting.

Figure 3:
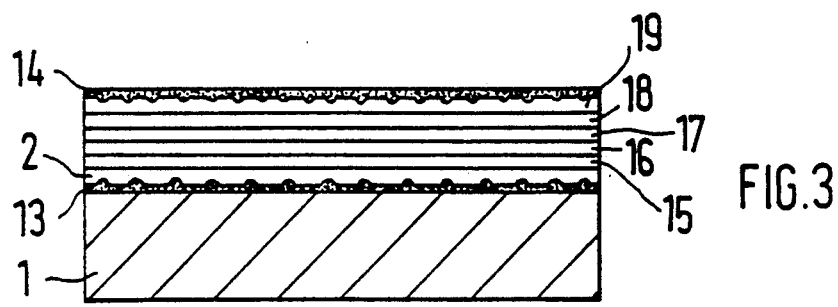
FIG. 3 shows an optical switch with several layers.

FIG. 3 shows a further embodiment of the optical switch which has a single, patterned electrode 13 on the substrate strate 1. Over the layer 2, further layers 15-19 are provided which preferably all have the same thickness as the layer 2.

The layer 19, i.e., the top layer, is covered by a likewise patterned electrode 14. At least one of the electrodes 13, 14 is transparent to the light to be switched.

In another embodiment (not shown), the optical switch of FIG. 3 has two transparent electrodes 13, 14, and mirrors 7 and 8 as shown in FIG. 2 are provided between the substrate 1 and the electrode 13 and on the electrode 14, respectively.

Because of the mirrors 7 and 8, the light entering the layer 2 through the mirror 8 will traverse the layer 2 several times, so that the effect of the diffraction patterns produced by the electric fields will increase. This allows such an optical switch to be operated at lower drive voltages.

The layers 2, 15-19 in the two last-mentioned embodiments can preferably also be formed from second-order non-linear optical polymers. They are poled, so that layers lying on top of each other have different nonlinear optical properties. In particular, polymers such as polymethyl methacrylate which are doped with different levels of an optically nonlinear dye and corona-poled may be arranged in layers. Corona poling is known, for example, from J. Appl. Phys. Vol. 67, No. 2, pages 1037-1041. Refractive indices of the poled nonlinear optical layers can be changed by an electric field produced between the electrodes 13, 14, with the change in the refractive indices of superposed layers being different.

The two last-described structures will be particularly efficient if the refractive indices of the layers 2, 15-19 are identical in the presence of an infinitesimal electric field and change in opposite directions under the influence of an electric field. To this end, the dye molecules in superposed layers are oriented in opposite directions during poling, i.e., the poling is opposite.

To produce these differently poled layers, e.g., the layers 2, 15-19, two polymers with different softening temperature points are used alternately. After formation of the successive layers, poling first takes place at the higher softening temperature, so that a uniform orientation of the dye molecules is obtained in all layers 2, 15-19. In a second poling process at the lower softening temperature, poling is then effected with the opposite electric field, with the dye molecules being reoriented only in every other layer because of the lower temperature.

Alternatively to the use of two NLO polymers with different softening behaviors, use can be made of an NLO polymer whose softening behavior is changeable. Especially suited are cross-linkable NLO polymeres in which the orientation of the dye molecules is fixed by cross-linkage during or after poling. Each of the layers 2, 15-19 is poled and cross-linked after its deposition, the poling technique used being preferably corona poling.

If a light wave incident obliquely on the optical switch of FIG. 3 traverses the layers 2, 15-19, only a small portion of the light will be reflected at the interfaces of the electrodes 13, 14 and the substrate 1 if all layers 2, 15-19 have the same refractive index. If, however, the refractive indices of successive layers differ and Bragg's reflection condition, $$z \cdot \lambda = 2 \cdot d \cdot \sin \rho$$

where
$z$ = order (integer)
$\lambda$ = wavelength
$d$ = thickness of the individual layer
$\rho$ = glancing angle is satisfied, high reflection of the light beam will occur. The optical switch can be switched between these two optical states by applying different voltages to the electrodes 13 and 14. In one of the states, the applied voltage may also be zero.

If at least one of the electrodes 13, 14 consists of several regions, regions with different reflectances can be formed by suitable electric control.

During the poling of nonlinear optical polymers, birefrigence is caused by a change in refractive index. Via this change in refractive index, successive layers 2, 15-19 can be produced which lead to Bragg reflection already in the presence of an infinitesimal electric field. In this manner, refraction patterns can be implemented which are effective even in the absence of a field and can be modified by electric fields.

Figure 4:
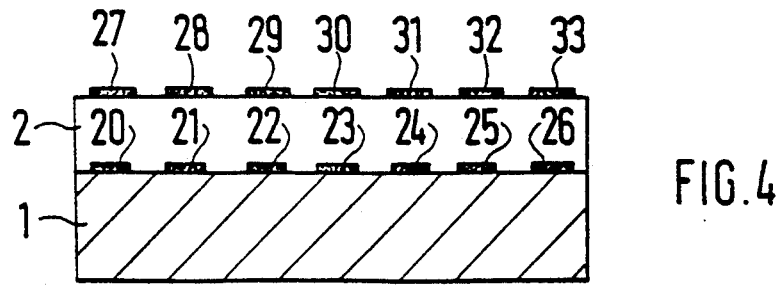
FIG. 4 shows an optical switch with a single layer and a plurality of electrodes.

A further embodiment of an optical switch according to the invention (FIG. 4) again comprises the layer 2 over the substrate 1, but no further layers. It is provided with a plurality of electrodes: electrodes 20-26 between the substrate 1 and the layer 2, and electrodes 27-33 on the layer 2. By this arrangement a particular, either fixed or variable interference pattern can be electrically produced during the manufacture of the switch, both during the manufacture and the operation of the optical switch, or exclusively during operation. In particular, the electrodes may be energized sequentially during poling. For instance, an electric field which permits the formation of an arbitrarily inclined poling zone may be applied between every two electrodes at a given time.

For example, the electrode pairs 21, 27; 22, 28; 23, 29; 24, 30; 25, 31 and 26, 32 may be energized sequentially. In this manner, interference patterns can be produced which are also effective for normally incident light.

We claim:

1. An optical switch comprising:
   a substrate;
   a transparent material in which a three-dimensional diffraction pattern is recorded which is capable of diffracting light, the material having non-linear optical properties and extending in the form of a first layer above the substrate; and
   at least one first electrode and at least one second electrode for varying the diffraction pattern in accordance with applied voltages;
   wherein the transparent material is a polymer with molecules of a particular predefined internal orientation; and
   wherein the polymer is formed as a plurality of sub-layers, each sub-layer having molecules of a respective internal orientation which is different from orientations of an overlying sub-layer and an underlying sub-layer.

2. An optical switch as claimed in claim 1, wherein the electrodes are arranged on the first layer of transparent material.

3. An optical switch as claimed in claim 1, wherein
a first dielectric mirror is provided disposed on the first layer of transparent material; and
a second dielectric mirror is provided disposed between the first layer of transparent material and the substrate;
wherein the electrodes are arranged between the first layer of transparent material and the second dielectric mirror.

4. An optical switch as claimed in claim 1, further comprising:
a plurality of further layers disposed over the first layer of transparent material,
wherein the at least one first electrode is disposed between the first layer of transparent material and the substrate, and the at least one second electrode is disposed on the uppermost of the plurality of further layers.

5. An optical switch as claimed in claim 4, wherein at least one third electrode is provided disposed below the first layer of transparent material, and at least one fourth electrode is provided disposed on the uppermost layer of the plurality of further layers.

6. An optical switch comprising:
a substrate;
a transparent material in which a three-dimensional diffraction pattern is recorded which is capable of diffracting light, the material having non-linear optical properties and extending in the form of a first layer above the substrate; and
at least one first electrode and at least one second electrode for varying the diffraction pattern in accordance with applied voltages;
wherein the transparent material is a polymer with molecules of a particular predefined internal orientation; and
wherein the polymer is formed as a plurality of sub-layers, each sub-layer having molecules of a respective orientation which is opposite to an orientation of an overlying sub-layer and an underlying sub-layer.

7. A method of forming an optical switch comprising:
providing a substrate of a dielectric material;
providing an optical material having non-linear optical properties on said substrate; and
providing a plurality of electrodes on at least one surface of said optical material;
wherein the step of providing the optical material comprises depositing a plurality of layers of optical material on the substrate.

8. A method of forming an optical switch as claimed in claim 7, wherein the optical material is an organic or an inorganic crystal having non-linear optical properties.

9. The method according to claim 7, wherein:
said dielectric material substrate is composed of glass;
said optical material is composed of a second order non-linear optical polymer having spatially oriented dye molecules, the spatial orientation being established by heating the material to a temperature near a softening point of the material, applying an electric field to the material, and cooling the material down with the electric field applied; and
said electrodes are transparent and are composed of indium-tin oxide.

10. The method according to claim 9, wherein the plurality of layers of optical material have an internal spatial orientation of dye molecules which is different from the orientations of any respective overlying and underlying layers of optical material.

11. The method according to claim 7, wherein the step of providing electrodes comprises providing electrodes between the substrate and the optical material.

12. The method according to claim 7, further comprising providing first and second dielectric mirrors, the first mirror being disposed between the substrate and the optical material, and the second mirror being disposed on a surface of the optical material opposite to and parallel with the first mirror, the second mirror being partially transparent to light incident on a surface thereof opposite the optical material.

13. An optical switch according to claim 1, further comprising first and second dielectric mirrors, the first mirror being disposed between the substrate and the transparent material, and the second mirror being disposed on a surface of the transparent material opposite to and parallel with the first mirror, the second mirror being partially transparent to light incident on a surface thereof opposite the transparent material.

14. The optical switch as claimed in claim 6, wherein the electrodes are arranged on the first layer of transparent material.

15. An optical switch as claimed in claim 6, wherein
a first dielectric mirror is provided disposed on the first layer of transparent material; and
a second dielectric mirror is provided disposed between the first layer of transparent material and the substrate;
wherein the electrodes are arranged between the first layer of transparent material and the second dielectric mirror.

16. An optical switch as claimed in claim 6, further comprising:
a plurality of further layers disposed over the first layer of transparent material,
wherein the at least one first electrode is disposed between the first layer of transparent material and the substrate, and the at least one second electrode is disposed on the uppermost of the plurality of further layers.

17. An optical switch as claimed in claim 16, wherein at least one third electrode is provided disposed below the first layer of transparent material, and at least one fourth electrode is provided disposed on the uppermost layer of the plurality of further layers.

18. An optical switch according to claim 6, further comprising first and second dielectric mirrors, the first mirror being disposed between the substrate and the transparent material, and the second mirror being disposed on a surface of the transparent material opposite to and parallel with the first mirror, the second mirror being partially transparent to light incident on a surface thereof opposite the transparent material.

* * * * *